(12) United States Patent
Lee et al.

(10) Patent No.: US 11,015,495 B2
(45) Date of Patent: May 25, 2021

(54) DRAIN PLUG FOR OIL PAN

(71) Applicants: Hyundai Motor Company, Seoul (KR); Kia Motors Corporation, Seoul (KR)

(72) Inventors: Byung-Hyun Lee, Bucheon-si (KR); Hyun-Jun Kim, Suwon-si (KR); Jung-Ho Joo, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 353 days.

(21) Appl. No.: 16/203,389

(22) Filed: Nov. 28, 2018

(65) Prior Publication Data

US 2019/0186313 A1 Jun. 20, 2019

(30) Foreign Application Priority Data

Dec. 19, 2017 (KR) ........................ 10-2017-0175310

(51) Int. Cl.
*F01M 11/04* (2006.01)
*F16H 57/04* (2010.01)

(52) U.S. Cl.
CPC . *F01M 11/0408* (2013.01); *F01M 2011/0416* (2013.01); *F16H 57/0452* (2013.01)

(58) Field of Classification Search
CPC ....... F01M 11/0408; F01M 2011/0416; F01M 2011/0425; F16H 57/0452; B60K 2015/0412; B60K 2015/0432; B60K 15/0409; B65D 41/0471; B65D 41/0478
See application file for complete search history.

(56) References Cited

U.S. PATENT DOCUMENTS

| | | | | |
|---|---|---|---|---|
| 3,967,697 A * | 7/1976 | Guenther | ........... | F01M 11/0408 184/1.5 |
| 5,048,578 A | 9/1991 | Dorf et al. | | |
| 5,699,922 A * | 12/1997 | Harding | ............ | B65D 41/0478 215/201 |
| 6,343,705 B1 * | 2/2002 | Minnette | ............ | B65D 41/0471 215/216 |
| 8,561,761 B2 | 10/2013 | Jessberger et al. | | |
| 8,875,933 B2 * | 11/2014 | Griffiths | ............ | F01M 11/0408 220/573 |
| 10,119,437 B2 * | 11/2018 | Buchen | ................ | F16H 57/0408 |
| 2008/0135340 A1 | 6/2008 | Schlicker et al. | | |
| 2010/0294813 A1 * | 11/2010 | Delage | ............... | B65D 41/0471 222/153.11 |

(Continued)

FOREIGN PATENT DOCUMENTS

| | | | |
|---|---|---|---|
| JP | 2012-533702 A | 12/2012 | |
| JP | 2013-60875 A | 4/2013 | |

(Continued)

*Primary Examiner* — Minh Truong
(74) *Attorney, Agent, or Firm* — Morgan, Lewis & Bockius LLP

(57) ABSTRACT

A drain plug for an oil pan coupled to a plug mounting hole formed at one side of a lower portion of the oil pan, the drain plug may include a head portion configured to be formed at one end portion of the drain plug, and a screw portion configured to extend from the head portion and be screw-coupled to the plug mounting hole of the oil pan.

17 Claims, 6 Drawing Sheets

(56) References Cited

U.S. PATENT DOCUMENTS

| | | | | |
|---|---|---|---|---|
| 2011/0303670 A1* | 12/2011 | Baker | ............... | A61J 1/1475 |
| | | | | 220/257.1 |
| 2014/0034638 A1* | 2/2014 | Whelan | ............ | B60K 15/0409 |
| | | | | 220/86.2 |
| 2017/0057705 A1* | 3/2017 | Bailey | ............... | B65D 51/002 |
| 2018/0073625 A1* | 3/2018 | Miyazono | ............ | F16H 57/045 |
| 2020/0116051 A1* | 4/2020 | Itoya | ............... | F16H 57/0408 |

FOREIGN PATENT DOCUMENTS

| KR | 1998-046910 U | 9/1998 |
|---|---|---|
| KR | 10-1217730 B1 | 12/2012 |
| KR | 10-1223550 B1 | 1/2013 |

\* cited by examiner

DRAIN PLUG FOR OIL PAN

CROSS-REFERENCE(S) TO RELATED APPLICATIONS

The present application claims priority to Korean Patent Application No. 10-2017-0175310, filed on Dec. 19, 2017, the entire contents of which is incorporated herein for all purposes by this reference.

BACKGROUND OF THE INVENTION

Field of the Invention

The present invention relates to a drain plug for an oil pan, and more particularly, to a drain plug for an oil pan capable of preventing damage and a release by solving a problem that excessive torque is applied when assembling the drain plug.

Description of Related Art

Generally, a lubricating device for a vehicle is a device supplying oil to a portion where kinetic friction occurs, to allow an engine to operate smoothly and maintain long life span of the engine by changing solid friction to fluid friction by injecting oil to a friction surface to prevent sliding portions of a cylinder and a piston or rotating parts such as a crank shaft and a camshaft from being rapidly worn out or being burned to stick due to frictional force which is increased as frictional heat is generated due to direct friction between metals.

Furthermore, a lubricating method of the engine includes a splash lubrication type in which oil stored in an oil pan is scooped by a spatula attached at a lower end portion of a connecting rod for lubrication, a forced feed lubrication type in which oil stored in the oil pan is pumped using an oil pump and forcibly fed, and a splash and forced feed lubrication type in which the above two methods are combined, and currently, in accordance with high speed and high output of the engine, generally, the forced feed lubrication type has been mainly used.

Here, the oil pan which is an oil container serving to store lubricating oil of an engine and dissipate heat to the outside to lower a temperature of the oil is coupled to a cylinder block of the engine by putting a gasket and using a bolt. Furthermore, a portion of the oil pan is formed deeper than other portions and partitioned from other portions by a partition plate to secure sufficient oil at a bottom portion of the oil pan and prevent the oil from sloshing even when a vehicle is suddenly stopped or a vehicle body is inclined at the time of quick turning or driving on a slope during the driving of the vehicle, and to prevent a problem that a forced feed action of an oil pump is interrupted due to air drawn in when an oil strainer inlet is exposed to the air due to flow of the oil.

Furthermore, when a lubrication operation is repeatedly performed by supplying limited oil in the oil pan to each portion of the engine where kinetic friction occurs, various foreign materials are contained in the lubricating oil, deteriorating lubricating performance. Therefore, a drain hole is formed in a bottom surface of the oil pan to discharge various foreign materials to the outside or replace the lubricating oil and a drain plug opening or closing the drain hole is detachably coupled to the drain hole.

FIG. 1 is a schematic view of a conventional drain plug.

FIG. 1 illustrates a perspective view showing a state in which the conventional drain plug is coupled to an oil pan and an exploded perspective view of the drain plug. An oil pan 20 is divided into an upper oil pan 21 and a lower oil pan 22, a drain hole is formed in a bottom surface of the lower oil pan 22, an internal surface of the drain hole is threaded, a drain plug 10 is configured for a head portion 11 and a screw portion 13, and the screw portion 13 of an external circumferential surface of the drain plug 10 is detachably coupled to the drain hole. In the instant case, the drain plug 10 is coupled to the drain hole through a steel insert 15.

Accordingly, when the drain plug 10 is screw-coupled to the drain hole, the drain hole is closed by the drain plug, such that oil stored in the oil pan does not leak to the outside, and when the drain plug 10 is completely removed from the drain hole, the oil stored in the oil pan, foreign materials, or the like may be drained to the outside through the drain hole.

However, the conventional drain plug is a drain plug made of a steel material, and when excessive torque is applied, damage to an insert or plastic portion may be caused, and the present problem may occur differently depending on a skill level of an operator.

Furthermore, the conventional drain plug does not have a release prevention function, thus a problem that oil leaks when the drain plug is loosened or slackened occurs. Furthermore, since the drain plug is made of a steel material and formed by insert molding, a manufacturing process is complicated, deteriorating manufacturability and cost efficiency and increasing a load.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a drain plug for an oil pan configured for improving a manufacturing process and safety by preventing a problem that excessive torque is applied in a manufacturing process and preventing a release of the drain plug to prevent oil from leaking.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a drain plug for an oil pan coupled to a plug mounting hole formed at one side of a lower portion of the oil pan, the drain plug may include: a head portion configured to be formed at one end portion of the drain plug; and a screw portion configured to extend from the head portion and be screw-coupled to the plug mounting hole of the oil pan.

The drain plug may include a plastic material.

A fastening groove for screw coupling may be formed in a center portion of the head portion.

The fastening groove may have a linear shape.

A stopper groove coupled to a stopper may be formed at one side of an external circumference portion of the head portion.

A protrusion may be formed on an internal surface of an external circumference portion of the head portion.

The protrusion may have an arc shape.

One or more protrusions may be formed to be spaced from each other.

One end portion of the protrusion may be formed with a hook.

A wrench hole may be formed in an end portion of the screw portion.

The wrench hole may be a polygon.

The plug mounting hole may be formed with one or more locking protrusions.

The locking protrusions may be formed along a circumference of the plug mounting hole.

Stopper fixing bars may be formed at one side of the plug mounting hole.

The drain plug may further include an O-ring for preventing leakage of oil.

The drain plug may further include a stopper for preventing a release of the drain plug.

The stopper may have a winding and bent shape.

The stopper may be fixed to stopper fixing bars at one side of the plug mounting hole.

The stopper may have elasticity.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
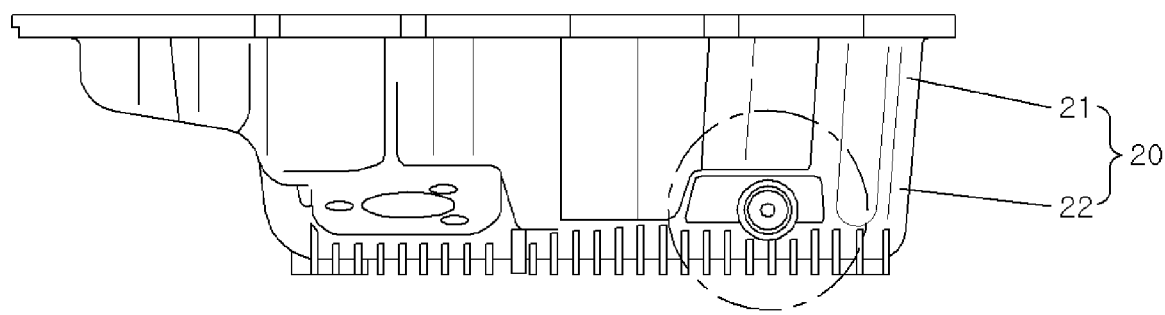
FIG. 1 is a schematic view of a conventional drain plug.
Figure 1B:
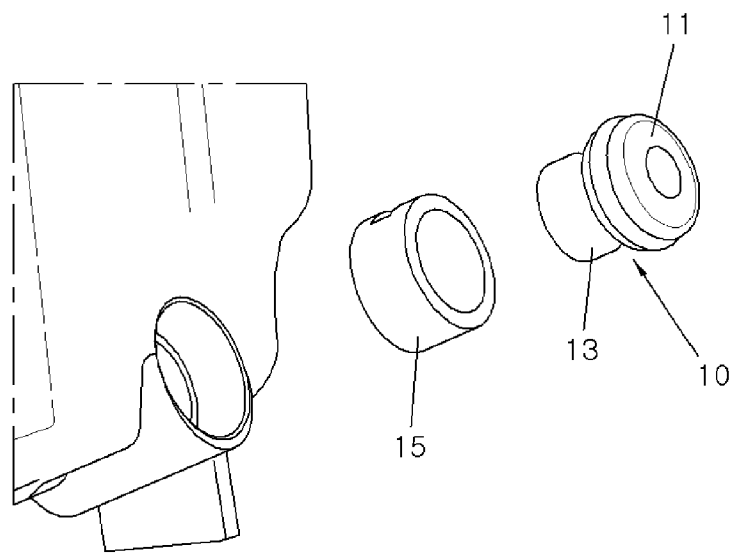

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments described hereinbelow are provided for a person skilled in the art to readily understand a technical idea of the present invention, and the present invention is not limited by the embodiments. Furthermore, matters expressed in the accompanying drawings are illustrated to facilitate explanation of the exemplary embodiments of the present invention and may be different from an actually implemented form.

It is to be understood that when one element is referred to as being "connected to" or "coupled to" another element, it may be directly connected to or coupled directly to another element or be connected to or coupled to another element, having the other element intervening therebetween.

Furthermore, the term "connection" used herein may include direct connection and indirect connection between one member and another member, and may mean all physical connection such as adhesion, attachment, fastening, bonding, coupling, and the like.

Furthermore, expressions such as "first" and "second" are expressions used only to distinguish a plurality of components, thus do not limit an order among the components or other features of the components.

Singular forms are intended to include plural forms unless the context clearly indicates otherwise. Terms "include" or "have" used in the exemplary embodiment are to specify the presence of stated features, numerals, steps, operations, components, parts, or a combination thereof, and it may be construed that addition of one or more other features, numerals, steps, operations, components, parts, or a combination thereof is possible.

Before describing a drain plug for an oil pan according to an exemplary embodiment of the present invention, the following will be described. The conventional drain plug includes a steel material and thus may cause damage to a product due to application of excessive torque depending on a skill level of an operator, and the conventional drain plug does not have a release prevention function, thus a problem that the drain plug is loosened or slackened occurs, and since the conventional drain plug includes a steel material, it is formed by insert molding and such a complicated manufacturing process results in deterioration in manufacturability. As a result, a drain plug for an oil pan configured for or solving the problems as described above has been required, and in response thereto, applicants of the present invention provide a drain plug for an oil pan according to an exemplary embodiment of the present invention through deep research and various experiments.

Figure 2:
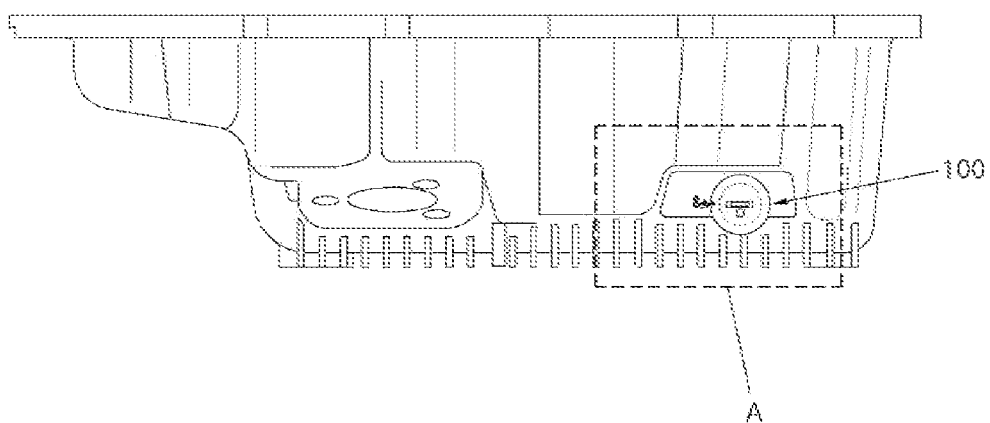
FIG. 2 is a schematic view illustrating coupling of a drain plug for an oil pan according to an exemplary embodiment of the present invention.

FIG. 2 is a schematic view illustrating coupling of a drain plug for an oil pan according to an exemplary embodiment of the present invention.

Referring to FIG. 2, a plug assembly includes a drain plug 100 for an oil pan coupled to a plug mounting hole formed at one side of a lower portion of the oil pan is coupled to the oil pan and a housing 150 formed to the oil pam. The drain plug 100 is detachably coupled to a drain hole formed in the housing 150 to open or close the drain hole in a bottom surface of the oil pan to discharge lubricating oil and various foreign materials contained in the lubricating oil to the outside or replace the lubricating oil. A configuration of the drain plug will be described below in detail.

Figure 3:
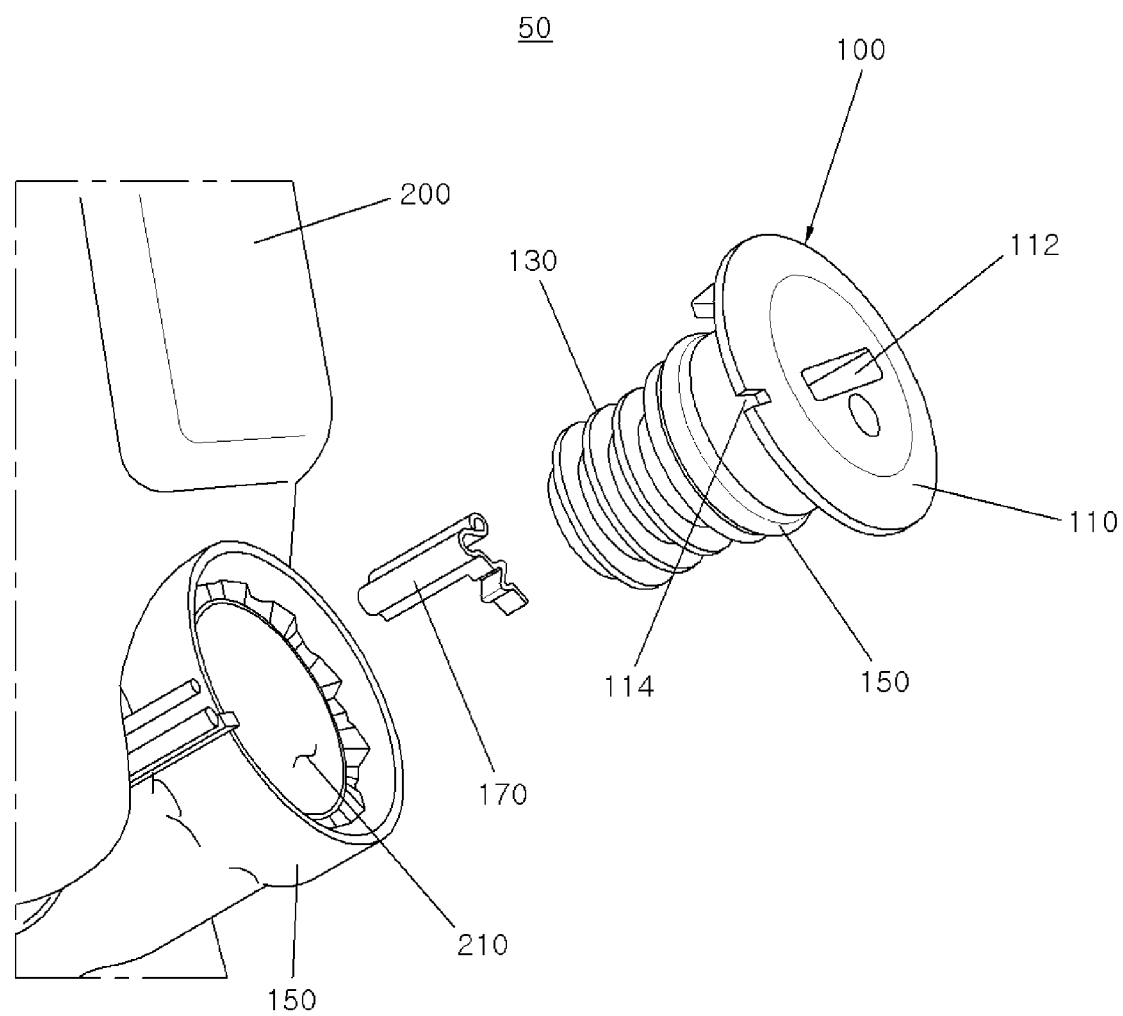
FIG. 3 is a perspective view illustrating coupling of the drain plug for an oil pan according to the exemplary embodiment of the present invention in FIG. 2.
Figure 4:
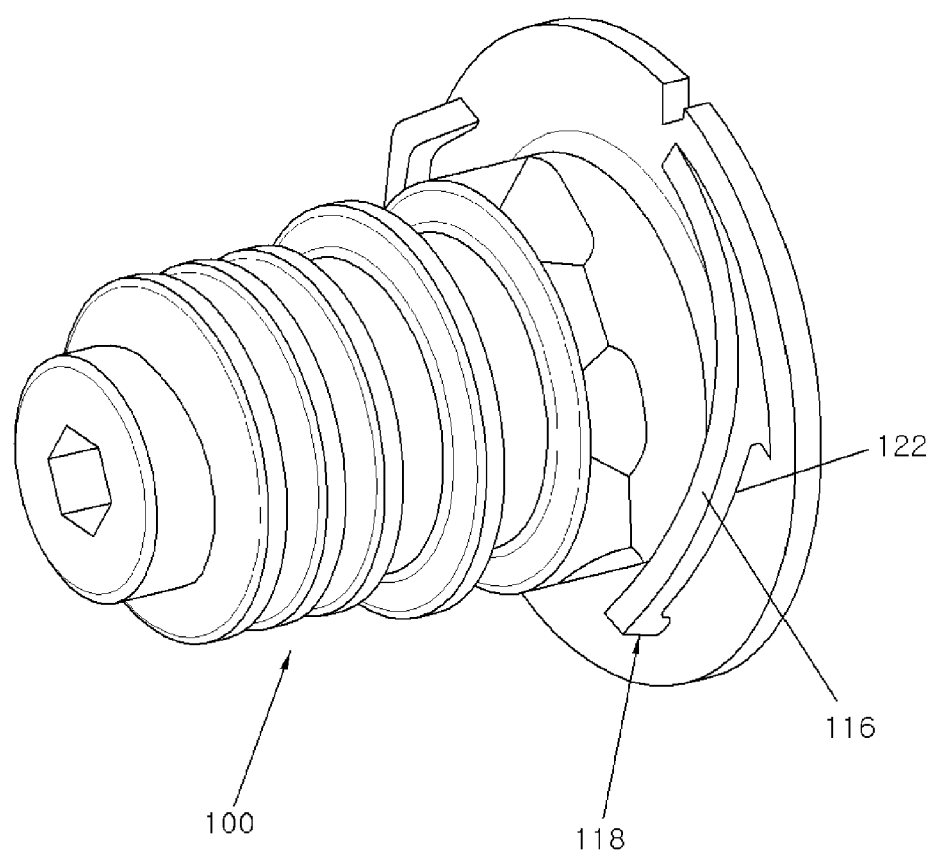
FIG. 4 is a perspective view of a drain plug mounting hole and the drain plug for an oil pan according to the exemplary embodiment of the present invention in FIG. 2.
Figure 5:
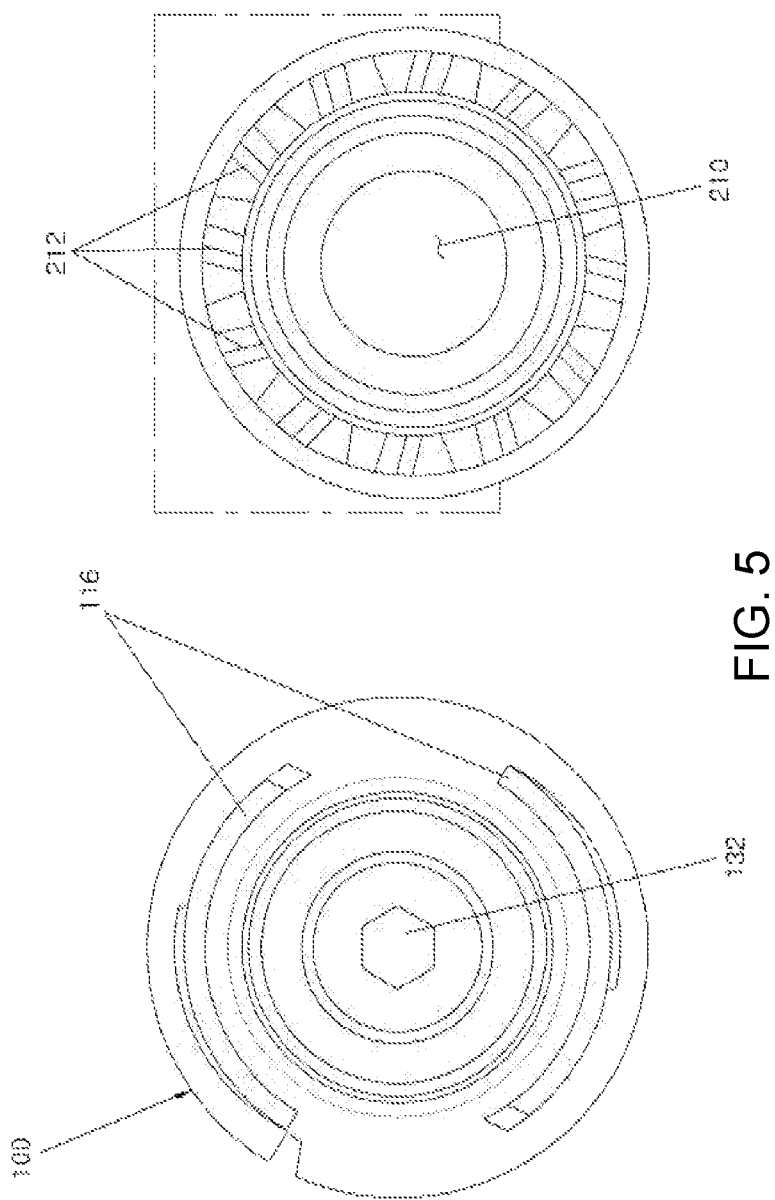
FIG. 5 is a schematic plan view of the drain plug mounting hole and the drain plug for an oil pan according to the exemplary embodiment of the present invention in FIG. 2.

FIG. 3 is a perspective view illustrating coupling of the drain plug for an oil pan according to the exemplary embodiment of the present invention in FIG. 2, FIG. 4 is a schematic view of a drain plug mounting hole and the drain plug for an oil pan according to the exemplary embodiment of the present invention in FIG. 2, and FIG. 5 is a schematic plan view of the drain plug mounting hole and the drain plug for an oil pan according to the exemplary embodiment of the present invention in FIG. 2.

Referring to FIG. 3, FIG. 4, and FIG. 5, the drain plug 100 for an oil pan 200 coupled to a plug mounting hole 210 formed at the housing 150 at one side of a lower portion of the oil pan 200 to form the drain hole is configured to include a head portion 110 formed at one end portion of the drain plug 100, and a screw portion 130 extending from the head portion 110 and screw-coupled to the plug mounting hole 210 of the oil pan 200.

In an exemplary embodiment of the present invention, the drain plug 100 includes a plastic material, and formed with a fastening groove 112 for screw coupling in a center portion of the head portion 110, in which the fastening groove 112 may have a linear shape and may also have a cross shape.

The drain plug 100 is formed with a stopper groove 114 coupled to a stopper 170 at one side of an external circumference portion of the head portion 110, and a protrusion 116 is formed on an internal surface of the external circumference portion of the head portion 110. Here, the protrusion 116 has an arc shape, and in the drawings, two protrusions 116 are formed to be spaced from each other. However, the number of protrusions 116 formed to be spaced from each other may be two or more and may also be one. One end portion of the protrusion 116 is formed with a hook 118, which prevents the drain plug 100 from being loosened or separated from the plug mounting hole 210 of the oil pan 200.

Furthermore, the drain plug 100 further includes an O-ring between the housing 150 and the head portion 110 for preventing leakage of oil and the stopper 170 for preventing a release of the drain plug 100. A coupling structure of the stopper 170 will be described in detail below.

In the drain plug 100, a wrench hole 132 is formed in an end portion of the screw portion 130, such that separation of the drain plug 100 is possible using the wrench hole 132 even when the fastening groove 112 formed in the head portion 110 is damaged.

The plug mounting hole 210 of the oil pan 200 coupled to the drain plug 100 according to an exemplary embodiment of the present invention is formed with one or more locking protrusions 212, and the locking protrusions 212 are formed along a circumference of the plug mounting hole 210.

Figure 6:
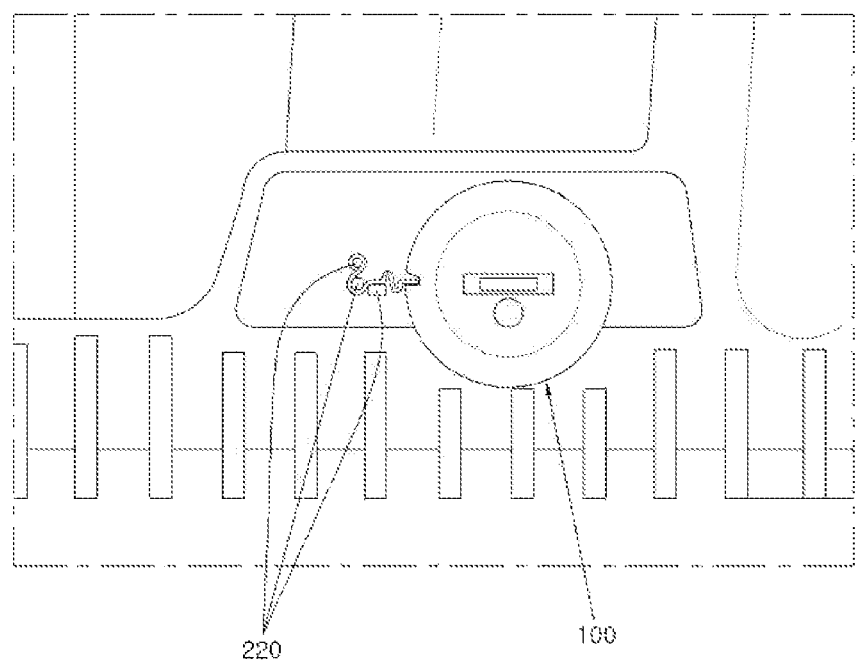
FIG. 6 is an enlarged schematic view of portion A.
Figure 7:
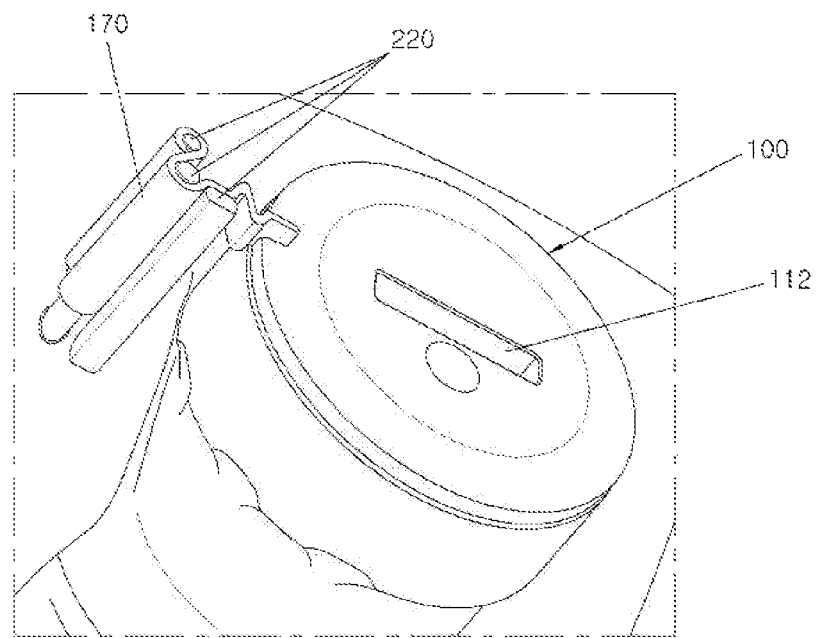
FIG. 7 is an enlarged schematic view of the drain plug for an oil pan according to the exemplary embodiment of the present invention in FIG. 6.

FIG. 6 is an enlarged schematic view of portion A, and FIG. 7 is an enlarged schematic view of the drain plug for an oil pan according to the exemplary embodiment of the present invention in FIG. 6.

Referring to FIG. 6 and FIG. 7 together with FIG. 3, the drain plug 100 according to an exemplary embodiment of the present invention is coupled to the plug mounting hole 210 formed at one side of the lower portion of the oil pan 200, and stopper fixing bars 220 are formed at one side of the plug mounting hole 210.

The stopper 170 has a winding and bent shape, and is fixed to the stopper fixing bars 220 formed to be spaced from each other at one side of the plug mounting hole 210.

Referring to the drawings, an operation relationship of the drain plug for an oil pan according to the exemplary embodiment of the present invention will be described. The drain plug 100 is coupled to the plug mounting hole 210 formed at one side of the lower portion of the oil pan 200 and is configured to include the head portion 110 and the screw portion 130 extending from the head portion 110 and screw-coupled to the plug mounting hole 210 of the oil pan 200.

The drain plug 100 is formed with the fastening groove 112 formed in the center portion of the head portion 110 in a linear shape for screw coupling, to be coupled to the plug mounting hole 210 by being pressurized and rotated.

Furthermore, the drain plug 100 is formed with the stopper groove 114 coupled to the stopper 170 having elasticity at one side of the external circumference portion of the head portion 110, such that one end portion of the stopper 170 is engaged with the stopper groove 114, preventing the release of the drain plug 100.

Meanwhile, in the drain plug 100, the protrusion 116 is formed on the internal surface of the external circumference portion of the head portion 110 and has an arc shape. Two or more protrusions 116 are formed to be spaced from each other, and one end portion of the protrusion 116 is formed with the hook 118. Furthermore, the plug mounting hole 210 of the oil pan 200 coupled to the drain plug 100 is formed with one or more locking protrusions 212, and the locking protrusions 212 are formed along the circumference of the plug mounting hole 210.

In an exemplary embodiment of the present invention, an end portion of the protrusion 116 is spaced from the external circumference portion of the head portion 110 with a gap 122 so that the end portion of the protrusion 116 has elasticity.

In an exemplary embodiment of the present invention, the end portion of the protrusion 116 includes the hook 118.

The protrusion 116 is locked to the locking protrusions 212 to prevent the release of the drain plug 100, such that it is possible to prevent the drain plug 110 from being loosened or separated from the plug mounting hole 210 of the oil pan 200. Furthermore, since one end portion of the protrusion 116 is formed with the hook 118, when the drain plug 100 is coupled to the plug mounting hole 210 of the oil pan 200, a sound is generated to enable recognition of completion of assembly, preventing excessive torque is applied at the time of assembly.

Meanwhile, in the drain plug 100, the wrench hole 132 is formed in the end portion of the screw portion 130, such that separation from the plug mounting hole 210 and replacement of the drain plug 100 are possible by fitting a wrench into the wrench hole 132, when the head portion 110 of the drain plug 100 according to an exemplary embodiment of the present invention is damaged and thus the separation of the drain plug 100 from the plug mounting hole 210 of the oil pan 200 is impossible.

In accordance with embodiments of the present invention, the drain plug for an oil pan may prevent damage by solving the problem that excessive torque is applied, has the release prevention are configured to solve the problem that oil leaks due to the loosened or slackened drain plug, and includes a plastic material to reduce a weight thereof and simplify the manufacturing process, improving manufacturability and cost efficiency.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A drain plug assembly for an oil pan, the plug assembly comprising:
    a housing including a plug mounting hole formed in the housing; and
    a drain plug selectively coupled to the plug mounting hole of the housing,
    wherein the drain plug includes:
        a head portion formed at an end portion of the drain plug; and
        a screw portion formed to extend from the head portion,
        wherein the screw portion is selectively screw-coupled to the plug mounting hole of the housing,
        wherein the head portion of the drain plug is selectively locked to the housing, wherein a stopper groove selectively coupled to a stopper is formed at a side of an external circumference portion of the head portion in a radial direction of the head portion such that the head portion of the drain plug is locked to the housing by the stopper when the stopper is locked to the stopper groove, wherein a portion of the stopper is configured to be couple to the stopper groove for preventing a release of the drain plug from the housing while the head portion of the drain plug is locked to the housing by the stopper, and wherein the stopper has a corrugated structure.

2. The drain plug assembly of claim 1, wherein the drain plug assembly includes a plastic material.

3. The drain plug assembly of claim 1, wherein a fastening groove for screw coupling is formed in a center portion of the head portion.

4. The drain plug assembly of claim 3, wherein the fastening groove is in a shape of a line having a predetermined length.

5. The drain plug assembly of claim 1, wherein stopper fixing bars are formed at a side of the plug mounting hole and the stopper is connected to the stopper fixing bars.

6. The drain plug assembly of claim 1, wherein the stopper is fixed to stopper fixing bars mounted at a side of the plug mounting hole.

7. The drain plug assembly of claim 6, wherein the stopper has an elasticity.

8. The drain plug assembly of claim 1, wherein a protrusion is formed on an internal surface of an external circumference portion of the head portion toward the screw portion.

9. The drain plug assembly of claim 8, wherein the protrusion has an arc shape along the external circumference portion of the head portion.

10. The drain plug assembly of claim 8, wherein an end portion of the protrusion is spaced from the external circumference portion of the head portion with a gap so that the end portion of the protrusion has elasticity.

11. The drain plug assembly of claim 10, wherein the end portion of the protrusion is formed with a hook.

12. The drain plug assembly of claim 8, wherein a plurality of protrusions is formed to be spaced from each other along the external circumference portion of the head portion.

13. The drain plug assembly of claim 12, wherein an end portion of each protrusion is formed with a hook.

14. The drain plug assembly of claim 13, wherein a locking protrusion is formed along an internal circumference of the plug mounting hole inside the housing.

15. The drain plug assembly of claim 1, wherein a wrench hole is formed in an end portion of the screw portion.

16. The drain plug assembly of claim 1, wherein the plug mounting hole is formed with at least a locking protrusion.

17. The drain plug assembly of claim 1, further including: an O-ring for preventing leakage of oil between the housing and the head portion.

* * * * *